US012427605B2

(12) United States Patent
Lin et al.

(10) Patent No.: US 12,427,605 B2
(45) Date of Patent: Sep. 30, 2025

(54) LASER PROCESSING SYSTEM AND METHOD FOR GLASS WORKPIECE

(71) Applicant: INDUSTRIAL TECHNOLOGY RESEARCH INSTITUTE, Hsinchu (TW)

(72) Inventors: Mao-Chi Lin, Tainan (TW); Shao-Chuan Lu, Changhua County (TW); Pin-Hao Hu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 847 days.

(21) Appl. No.: 17/105,369

(22) Filed: Nov. 25, 2020

(65) Prior Publication Data

US 2021/0387287 A1 Dec. 16, 2021

Related U.S. Application Data

(60) Provisional application No. 63/037,214, filed on Jun. 10, 2020.

(30) Foreign Application Priority Data

Oct. 16, 2020 (TW) ................. 109135849

(51) Int. Cl.
  *B23K 26/53* (2014.01)
  *B23K 26/03* (2006.01)
  (Continued)

(52) U.S. Cl.
  CPC ............ *B23K 26/53* (2015.10); *B23K 26/032* (2013.01); *B23K 26/0738* (2013.01);
  (Continued)

(58) Field of Classification Search
  CPC .......................... C03B 33/0222; C03B 33/033
  See application file for complete search history.

(56) References Cited

U.S. PATENT DOCUMENTS

2002/0006765 A1* 1/2002 Michel .................. B23K 26/53
                                                                451/28
2011/0127244 A1   6/2011 Li et al.
                  (Continued)

FOREIGN PATENT DOCUMENTS

CN       104071974 B      4/2016
CN       103551745 B      1/2017
                  (Continued)

OTHER PUBLICATIONS

C.-F. Chuang and K.-S. Chen, "A new technique for creating curved interior holes on ultrathin glass based on picosecond laser drilling and thermo-shock separation," 2018 Symposium on Design, Test, Integration & Packaging of MEMS and MOEMS (DTIP), Rome, Italy, 2018, pp. 1-5. (Year: 2018).*

(Continued)

*Primary Examiner* — Erin Snelting
(74) *Attorney, Agent, or Firm* — Maschoff Brennan

(57) ABSTRACT

A laser processing system for a glass workpiece comprises a frame with a first laser module thereon, a modifying device, and a blanking device. The blanking device comprises a second laser module, a hollow support element, a clamping module disposed on the frame, a heater disposed on the hollow support element, and a cooler connected to the clamping module. A method adapted to the system comprises a modifying process, a determining process, and a blanking process. In the modifying process, a first laser beam is irradiated to the glass workpiece along a processing contour line to intermittently modify the glass workpiece. According to the determining process, the blanking process is processed to have a crack being generated in a modified (Continued)

portion of the glass workpiece, wherein the crack divides the glass workpiece into an outer area and an inner area, and changes a temperature of the glass workpiece to have the glass workpiece being deformed, so that the outer area and the inner area are separated.

9 Claims, 9 Drawing Sheets

(51) Int. Cl.
  *B23K 26/073* (2006.01)
  *B23K 26/08* (2014.01)
  *B23K 26/70* (2014.01)
  *B23K 37/04* (2006.01)
  *C03B 33/02* (2006.01)
  *C03B 33/04* (2006.01)

(52) U.S. Cl.
  CPC .......... *B23K 26/083* (2013.01); *B23K 26/702* (2015.10); *B23K 26/703* (2015.10); *B23K 37/0408* (2013.01); *C03B 33/0222* (2013.01); *C03B 33/04* (2013.01)

(56) References Cited

U.S. PATENT DOCUMENTS

| | | | |
|---|---|---|---|
| 2015/0114044 A1 | 4/2015 | Saito et al. | |
| 2015/0165560 A1 | 6/2015 | Hackert et al. | |
| 2015/0232369 A1 | 8/2015 | Marjanovic et al. | |
| 2016/0280580 A1* | 9/2016 | Bohme | C03B 33/091 |
| 2018/0186678 A1* | 7/2018 | Boeker | C03B 33/093 |
| 2019/0144325 A1* | 5/2019 | Bowden | C03B 33/04 |
| | | | 219/121.69 |
| 2019/0385888 A1 | 12/2019 | Hattori | |
| 2020/0030917 A1* | 1/2020 | Groninger | B23K 26/0622 |

FOREIGN PATENT DOCUMENTS

| | | |
|---|---|---|
| CN | 106604898 A | 4/2017 |
| CN | 109311725 A | 2/2019 |
| CN | 107755904 B | 3/2020 |
| JP | 2015061033 A | 3/2015 |
| JP | 2019-59628 A | 4/2019 |
| JP | 2019061980 A | 4/2019 |
| TW | 521020 | 2/2003 |
| TW | 200808480 A | 2/2008 |
| TW | I367141 B1 | 7/2012 |
| TW | I520804 B | 2/2016 |
| TW | 201713446 A | 4/2017 |
| TW | I639479 B | 11/2018 |
| TW | I679077 B | 12/2019 |
| TW | 202006807 A | 2/2020 |

OTHER PUBLICATIONS

Chuang et al., "Crafting interior holes on chemically strengthened thin glass based onultrafast laser ablation and thermoshock crack propagations" Sensors and Actuators A: Physical, Jan. 1, 2020.

TW Office Action in Application No. 109135849 dated Feb. 19, 2021.

Chinese Office Action dated Jun. 30, 2023 as received in application No. 202110388912.0.

* cited by examiner

LASER PROCESSING SYSTEM AND METHOD FOR GLASS WORKPIECE

CROSS REFERENCE TO RELATED APPLICATION

This application claims the priority benefits of Taiwan application Serial No. 109135849, filed on Oct. 16, 2020, and on Patent Application No. 63/037,214 filed in U.S.A. on Jun. 10, 2020, the disclosures of which are incorporated by references herein in its entirety.

TECHNICAL FIELD

The present disclosure relates to a laser processing system for a glass workpiece and a laser processing method for the glass workpiece.

BACKGROUND

In the previous systems and methods for processing glass workpieces, mechanical polishing methods or laser ablation methods are usually used for cutting. An edge chipping of 100~150 micron (μm) is generated on the edge of the end product and a material sacrificed with width of 200 μm is generated in the processing contour line if the mechanical polishing method is used to cut the glass workpiece. In addition, it takes about 20~30 minutes for cutting the glass with diameter of 100 μm and thickness of 3 μm. Furthermore, since an arithmetical average roughness (Ra) of the edge of the end product is greater than 1 μm, a further smooth surface treatment is required, to have the arithmetical average roughness (Ra) on the edge of the end product being less than 1 μm.

An edge chipping of 30~50 μm is generated on the edge of the end product and a material sacrificed width of 50~100 μm is generated in the processing contour line if the laser ablation method is used to cut the glass workpiece. In addition, it takes about 10~15 minutes for cutting the glass with diameter of 100 μm and thickness of 3 μm. Furthermore, since the arithmetical average roughness (Ra) of the edge of the end product is greater than 1 μm, a further smooth surface treatment is required, to have the arithmetical average roughness (Ra) of the edge of the end product being less than 1 μm.

The previous systems and methods are not suitable for cutting the glass workpiece with less edge chipping, less material sacrificed width in a short processing time, and is lack of avoiding a further smooth surface processing to the cutting edge.

SUMMARY

In an embodiment of the present disclosure, a laser processing system for glass workpiece comprises a frame, a modifying device, and a blanking device. The modifying device comprises a first laser module disposed on the frame. The first laser module generates a first laser beam to modify a glass workpiece. The blanking device comprises a second laser module, a hollow support element, a heater, a clamping module and a cooler. The second laser module is disposed on the frame and generates a second laser beam to heat up the glass workpiece. The hollow support element is disposed on the frame, and supports the glass workpiece and contacts with an outer area of the glass workpiece. The heater is disposed on the hollow support element. The heater heats up the outer area. The clamping module is disposed on the frame and clamps an inner area of the glass workpiece. The cooler is connected to the clamping module, and cools down inner area.

In another embodiment of the present disclosure, a laser processing method for a glass workpiece comprises a modifying process, a blanking process, and a determining process. In the modifying process, a first laser beam emits to a glass workpiece along a processing contour line, to have the glass workpiece being intermittently modified along the processing contour line continuously. In the blanking process, a crack is generated in a modified portion of the glass workpiece. The crack divides the glass workpiece into an outer area and an inner area. The inner area is inside the outer area. A temperature of the glass workpiece is changed to have the glass workpiece being deformed, such that a difference between an inner size of the outer area and an outer size of the inner area reaches to a threshold value. The outer area and the inner area are separated. In the determining process, a $\gamma$ value of $\gamma=(\varnothing i/t)/d$ is calculated before the blanking process, and the blanking process is determined based on the $\gamma$ value, wherein, $\varnothing i$ represents an equivalent diameter of the processing contour line, d represents an equivalent distance from the processing contour line to outer edge of the glass workpiece, and t represents a thickness of the glass workpiece.

The foregoing will become better understood from a careful reading of a detailed description provided herein below with appropriate reference to the accompanying drawings.

DETAILED DESCRIPTION

Figure 1:
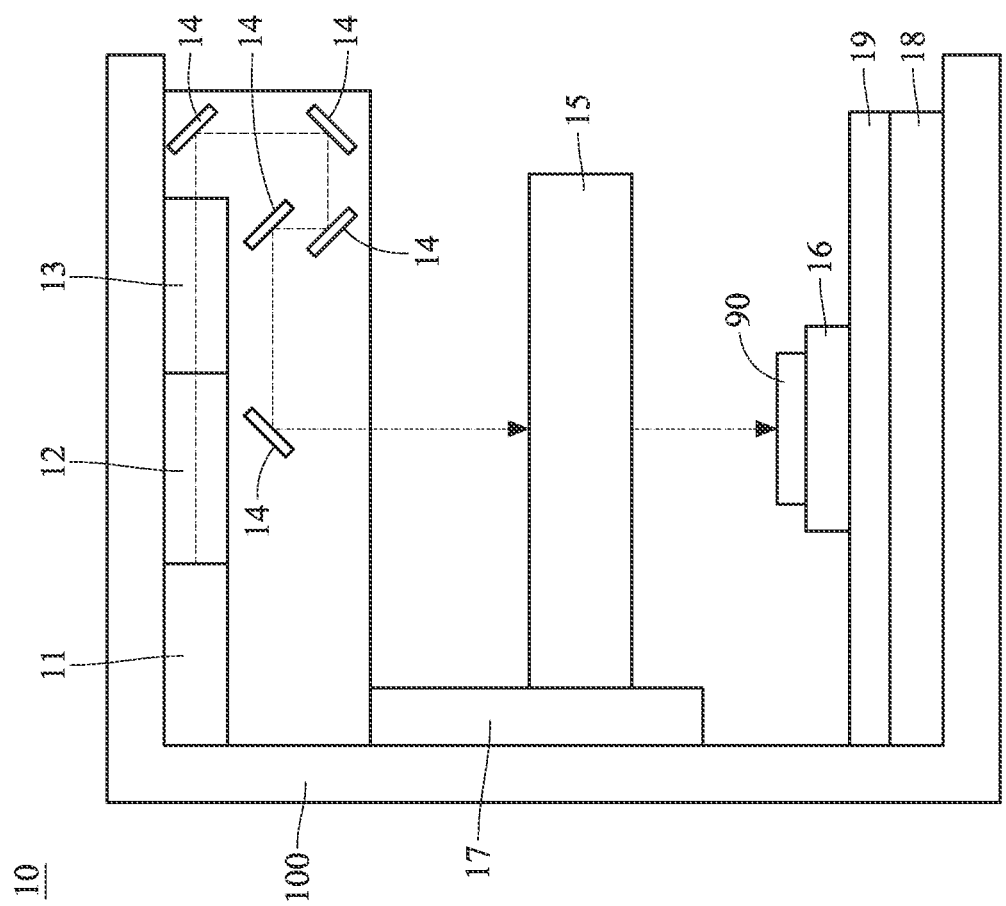
FIG. 1 is a schematic view of an embodiment of the modifying device of a laser processing system for a glass workpiece in accordance with this disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
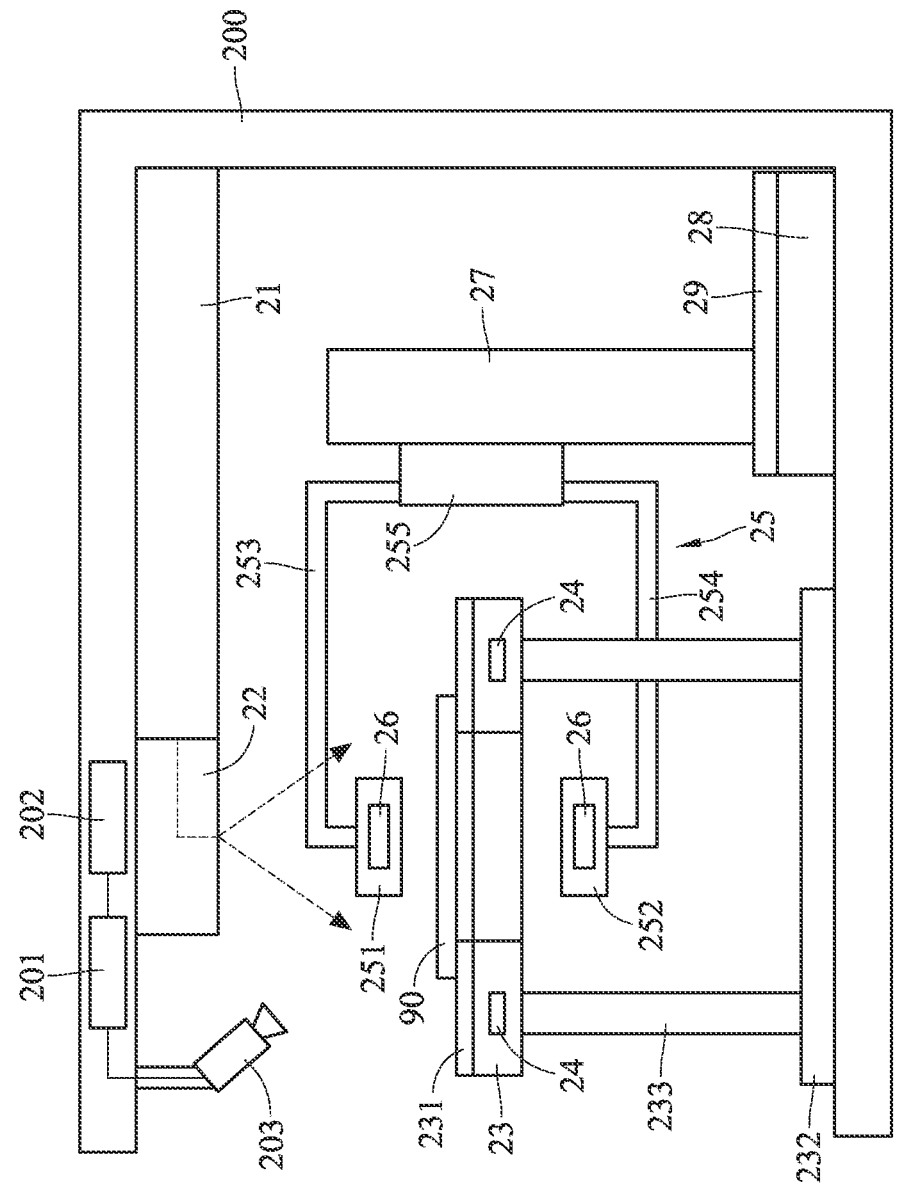
FIG. 2 is a schematic view of an embodiment of the blanking device of the laser processing system in accordance with this disclosure.

Refer to FIG. 1 and FIG. 2, FIG. 1 is a schematic view of an embodiment of the modifying device of a laser processing system for a glass workpiece in accordance with this disclosure. FIG. 2 is a schematic view of an embodiment of the blanking device of the laser processing system in accordance with this disclosure.

In this embodiment, a laser processing system for a glass workpiece comprises a first frame 100, a second frame 200, a modifying device 10 and a blanking device 20. As shown in FIG. 1, the modifying device 10 comprises a first laser module 11, a λ/4 circular-polarizing lens 12, a beam expander 13, a plurality of reflectors 14, a linear focus beam module 15, a vacuum chuck 16, a Z-axial driving module 17, an X-axial driving module 18 and a Y-axial driving module 19. Wherein, the first laser module 11, the λ/4 circular-polarizing lens 12, the beam expander 13, the reflectors 14, the Z-axial driving module 17 and the X-axial driving module 18 are disposed on the first frame 100. The Y-axial driving module 19 is disposed on the X-axial driving module 18. The vacuum chuck 16 is disposed on the Y-axial driving module 19. The linear focus beam module 15 is disposed on the Z-axial driving module 17. In this embodiment, the modifying device 10 is disposed on the first frame 100 and the blanking device 20 is disposed on the second frame 200, as shown in the embodiment of FIG. 2, including but not limited to, the modifying device 10 and the blanking device 20 are also able to be disposed on the same frame.

In this embodiment of FIG. 1, the Z-axial driving module 17 drives the linear focus beam module 15 to move along Z-axial direction. The X-axial driving module 18 drives the Y-axial driving module 19 to move along X-axial direction. The Y-axial driving module 19 drives the vacuum chuck 16 to move along Y-axial direction. The vacuum chuck 16 is able to move along X-axial direction and Y-axial direction and relative to the first frame 100 by the X-axial driving module 18 and the Y-axial driving module 19.

The glass workpiece 90 can be disposed on the vacuum chuck 16. The vacuum chuck 16 supports and fixes the glass workpiece 90. The first laser module 11 generates a first laser beam with the pulse width of less than 15 pico-second. The first laser beam generated from the first laser module 11 irradiates the glass workpiece 90 by passing through the λ/4 circular-polarizing lens 12, the beam expander 13, the reflectors 14 and the linear focus beam module 15. Depth of field of the first laser beam can be adjusted by the linear focus beam module 15. Linear focus beam module 15 can be such as Bessel focus beam module or Gaussian focus beam module.

A specific horizontal position of the glass workpiece 90 can be moved to an irradiated path of the first laser beam by the X-axial driving module 18 and the Y-axial driving module 19. Focus spot of the first laser beam can be adjusted to a specific depth of the glass workpiece 90 by the Z-axial driving module. Therefore, the modifying device 10 can modify the specific position of the glass workpiece 90. In another embodiment, the X-axial driving module, Y-axial driving module and Z-axial driving module can be set in arbitrary sequence as a three-dimensional driving module, the three-dimensional driving module is disposed on the first frame, and the linear focus beam module is disposed on the three-dimensional driving module, to have the focus spot of the first laser beam being adjusted to the specific position and the specific depth of the glass workpiece. In a further embodiment, the X-axial driving module, Y-axial driving module and Z-axial driving module can be set in arbitrary sequence as a three-dimensional driving module, the three-dimensional driving module is disposed on the first frame, and the vacuum chuck is disposed on the three-dimensional driving module, to have the focus spot of the first laser beam being adjusted to the specific position and the specific depth of the glass.

In this embodiment, a width of the modified portion of the glass workpiece 90 is nearly zero, but its physical property is different from no-modified portion. When the glass workpiece 90 bears the stress or receives the thermal stress, the modified area of the glass workpiece 90 has a phenomenon of stress concentration, and hence a crack is more easily generated on the modified portion than the no-modified portion of the glass workpiece 90. The crack hardly generates the material sacrificed width.

As shown in FIG. 2, the blanking device 20 comprises a second frame 200, a control unit 201, a storage unit 202, an optical detecting module 203, a second laser module 21, an optical path guiding module 22, a hollow support element 23, a heater 24, a clamping module 25, a cooler 26, a Z-axial driving module 27, an X-axial driving module 28 and a Y-axial driving module 29. Wherein, the heater 24 is disposed on the hollow support element 23. In addition, the control unit 201, the storage unit 202, the optical detecting module 203, the second laser module 21, the optical path guiding module 22, the hollow support element 23, and X-axial driving module 28 are disposed on the second frame 200, including but not limited to. In other embodiments, the control unit 201, the storage unit 202 or the optical detecting module 203 can be also separated from the second frame 200, and is disposed at a place where it can cooperate with the blanking device 20.

In this embodiment, Y-axial driving module 29 is disposed on the X-axial driving module 28. Z-axial driving module 27 is disposed on the Y-axial driving module 29. The clamping module 25 is disposed on the Z-axial driving module 27. The cooler 26 is connected to the clamping module 25, including but not limited to. In another embodiment, Y-axial driving module 29 is disposed on the hollow support element 23. In further embodiment, Y-axial driving module 29 can be a rotating module rotated along Z-axis.

In this embodiment, the clamping module 25 comprises a top clamping plate 251, a bottom clamping plate 252, a top clamping arm 253, a bottom clamping arm 254 and a clamping cylinder 255. The top clamping plate 251 is disposed on the top clamping arm 253, and the top clamping arm 253 is disposed on the clamping cylinder 255. The bottom clamping plate 252 is disposed on the bottom clamping arm 254, and the bottom clamping arm is disposed on the clamping cylinder 255. The clamping cylinder 255 is disposed on the Z-axial driving module 27. The cooler is connected to the top clamping plate 251 and the bottom clamping plate 252.

Wherein, the X-axial driving module 28 drives the Y-axial driving module 29 to move along X-axis. Y-axial driving module 29 drives the Z-axial driving module 27 to move along Y-axis. Z-axial driving module 27 drives the clamping cylinder 255 of the clamping module 25 to move along Z-axis. The clamping cylinder 255 of the clamping module 25 can be moved along z-axial direction, x-axial direction and y-axial direction and related to the second frame 200 by using the Z-axial driving module 27, the X-axial driving module 28 and the Y-axial driving module 29. In addition, in another embodiment that Y-axial driving module 29 disposed on the hollow support element 23, the clamping cylinder 255 of the clamping module 25 can be moved along z-axial direction and x-axial direction related to the second frame 200. The cylinder 255 drives the top clamping arm 253 and the bottom clamping arm 254 to be close or be far away from each other along z-axial direction, and hence drives the top clamping plate 251 and the bottom clamping plate 252 to open or close. The cooler 26 cools down the top clamping plate 251 and the bottom clamping plate 252 of the clamping module 25. The heater 24 heats up the hollow support element 23. The optical path guiding module 22 changes the emitting positions or the light spot size of the second laser beam generated from the second laser module 21. In this embodiment, the optical path guiding module 22 can be, but not limited to a Galvo scanning system. In other embodiments, the optical path guiding module can also comprise a reflect mirror and another Z-axial driving module those are disposed on the second frame 200. The position where a second laser beam emits can be changed by the reflect mirror and said another Z-axial driving module, wherein the second laser beam is generated from the second lase module.

In this embodiment, the optical detecting module 203 captures images by facing the hollow support element 23. The storage unit 202 stores different blanking processes. The control unit 201 loads one of the blanking processes, and controls to cooperate with the optical detecting module 203, the second laser module 21, the optical path guiding module 22, the heater 24, the clamping module 25 and/or the cooler 26 based on a loaded blanking process.

The modified glass work piece 90 can be placed on the hollow support element 23. The hollow support element 23 can comprise a vacuum adsorption device 231 for fixing the glass workpiece 90. The hollow support element 23 can comprise a thermal baffle 232 and a spacer block 233, wherein the spacer block 233 is located between the vacuum adsorption device 231 and the thermal baffle 232, and the thermal baffle 232 is disposed on the second frame 200 for thermal insulation.

A second laser beam with pulse width of micro-second is emitted by adjusting the parameters of the second laser module 21. The optical path guiding module 22 can change the position of the glass workpiece 90 emitted by the second laser beam. The second laser beam emits the glass workpiece to increase its temperature, to have the heater 24 heating up the hollow support element 23, and thus the contacting portion between the glass workpiece 90 and hollow support element 23 is heated up. The optical detecting module 203 can capture images of the glass workpiece 90 located on the hollow support element 23. The control unit 201 can determine if a crack is generated on the glass workpiece 90 based on the images of the glass workpiece 90.

The clamping cylinder 255 drives the top clamping plate 251 and the bottom clamping plate 252 to be open or close, and thus can release or clamp the glass workpiece 90. The cooler 26 decreases the temperature of the top clamping plate 251 and the bottom clamping plate 252, and further cools down the temperature of the contacting portion between the glass workpiece 90 and the top clamping plate 251, and cools down the temperature of the contacting portion between the glass workpiece 90 and the bottom clamping plate 252.

When a crack is generated on the glass workpiece 90, the glass workpiece is divided into two different elements as an outer area and inner area by means of the crack generated. The gap between the outer area and inner area is nearly zero, therefore, the material sacrifice width is nearly zero. The crack can make it difficult for the heat energy of the outer area and the heat energy of the inner area to transfer each other, and therefore the crack has the function of thermal barrier. At this moment, the outer area and the inner area may contact each other. When the temperature of the glass workpiece 90 is changed so that it is deformed by heat, and the difference between the inner size of the outer area and the outer size of the inner area reaches a threshold value, the outer area and the inner area can be separated.

For example, in an embodiment of laser processing system for a glass workpiece in accordance with this disclosure, when an inner area with diameter of 100 µm and thickness of 3 µm is cut from the glass workpiece 90, an edge chipping less than 10 µm is generated usually on the outer area and the inner area, and the outer area and the inner area nearly have no material sacrifice width. This process takes less than 0.5 minutes. Furthermore, the arithmetical average roughness (Ra) of the outer edge of the outer area and the inner edge of the inner area is less than 1 µm. Therefore, an end product with less edge chipping, less material sacrifice width, short processing time and less arithmetical average roughness (Ra) of the cutting edge can be obtained according to an embodiment of the laser processing system for a glass workpiece of the present disclosure.

Figure 3:
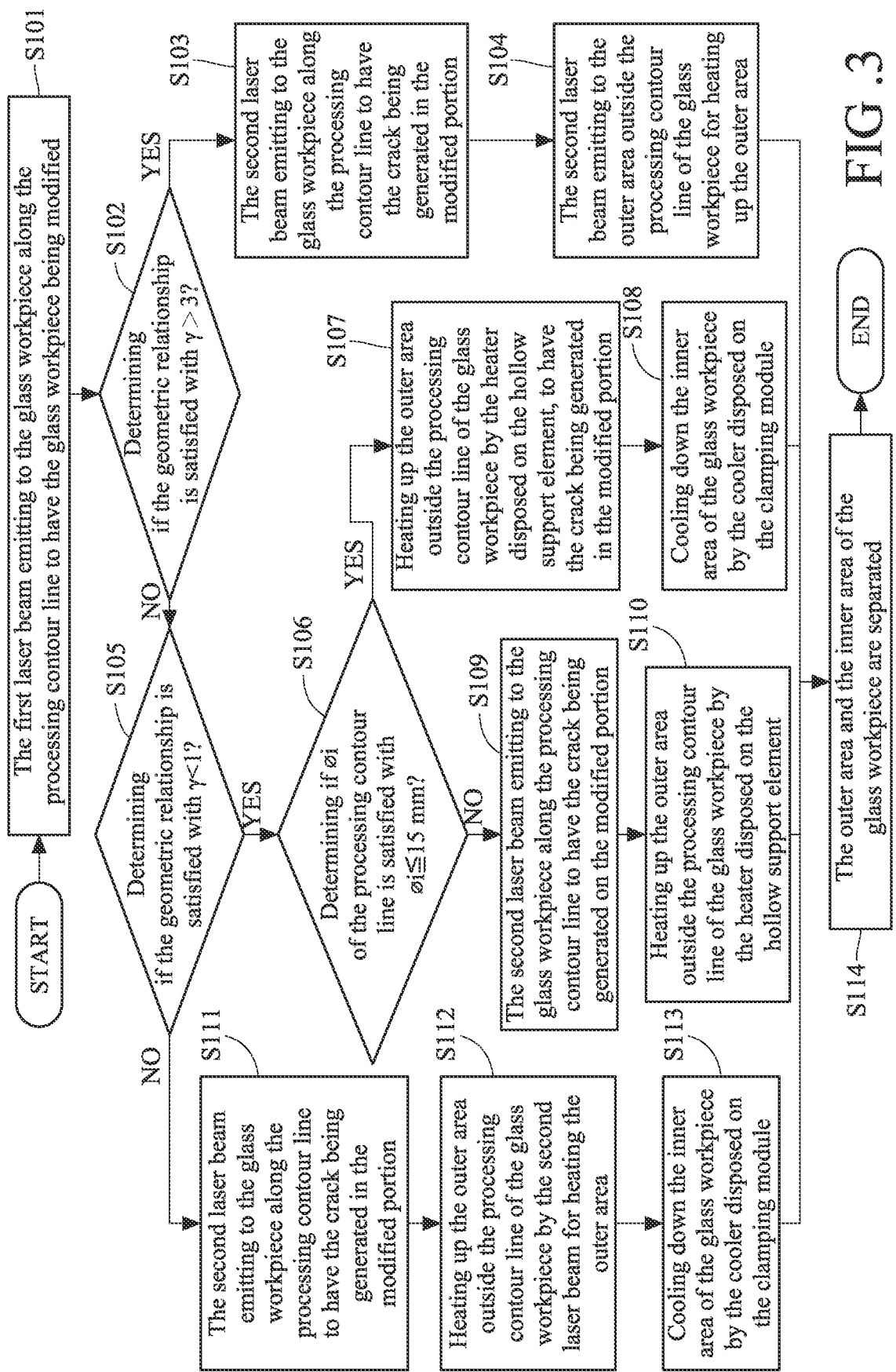
FIG. 3 is a flow chart of an embodiment of the laser processing method in accordance with this disclosure.
Figure 4:
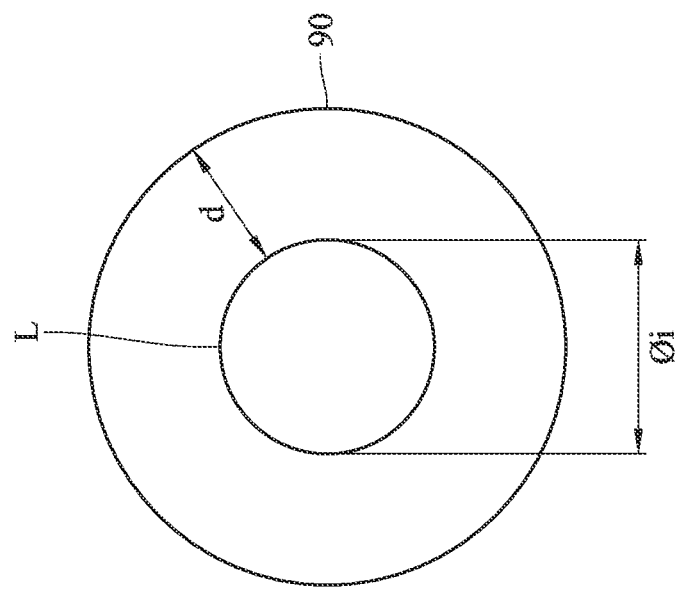
FIG. 4 is a top view of an exemplar of the processing contour line of the glass workpiece in accordance with this disclosure.

Please refer to FIG. 3 and FIG. 4. FIG. 3 is a flow chart of an embodiment of the laser processing method in accordance with this disclosure. FIG. 4 is a top view of the processing contour line of the glass workpiece in accordance with this disclosure.

Refer to FIG. 3, a modifying process is executed as step S101 of the first laser beam emitting to the glass workpiece along a processing contour line, to have the glass workpiece being modified. In detailed, the first laser module 11 of the modifying device 10 shown in FIG. 1 is used to emit the first laser beam. The first laser beam emits to the glass workpiece along a processing contour line L. The processing contour line L is a closed contour. Due to the first laser beam belongs to a pulse laser, the glass workpiece 90 is modified at the time that pulse is generated when the first laser beam scans along the processing contour line L. The glass workpiece 90 is continuously modified by the first laser beam belonging to the pulse laser. In the present embodiment, the first laser beam emits to the glass workpiece 90 along the processing contour line L of the glass workpiece as shown in FIG. 4. Then, the glass workpiece 90 is placed on the hollow support element 23 of the blanking device 20 shown in FIG. 2. Hereafter, step S102 will be executed.

Going on a determining process in step S102. In detailed, the control unit 201 in FIG. 2 calculates $\gamma=(\text{øi}/t)/d$. As shown in FIG. 4, an equivalent diameter of the processing contour line L is represented as øi, an equivalent distance from the processing contour line L to the outer edge of the glass workpiece is represented as d, the thickness of the glass workpiece 90 is represented as t. On condition that the shape of the processing contour line L and the shape of the outer edge of the glass workpiece 90 are round, the diameter of the processing contour line L is the equivalent diameter øi, the distance from processing contour line L to the edge of the glass workpiece 90 is the equivalent distance d. The control unit 201 shown in FIG. 2 further determines if the geometric relationship between glass workpiece 90 and processing contour line L is satisfied with $\gamma>3$, as shown in step S102. As shown in FIG. 3, if $\gamma>3$, step S103 is executed. If $\gamma>3$ is not satisfied (i. e. $\gamma\leq3$), step S105 is executed.

The control unit 201 shown in FIG. 2 chooses the blanking process on condition that $\gamma>3$ from the storage unit 202, and controls the blanking device 20 to execute the blanking process. Wherein, a crack generating process in the blanking process is executed in advance in advance. A second laser beam is generated by the second laser module 21 of the blanking device 20 shown in FIG. 2. In step S103, the second laser beam emits to the glass workpiece 90 along the processing contour line L to have the crack being generated in the modified portion. At this time, partial thermal stress is generated on the glass workpiece 90 along the processing contour line L. The crack is generated in the modified portion of the glass workpiece 90 by means of a phenomenon of stress concentration. Next, step S104 is further executed.

The separating processing in the blanking processing is executed as follows. The second laser beam is generated by the second laser module 21 of the blanking device 20 shown in FIG. 2. In step S104, the second laser beam emits to the outer area outside the processing contour line L of the glass workpiece 90 to heat up the outer area of the glass workpiece 90. In the present embodiment, the second laser beam emits to the outer area outside the processing contour line L of the glass workpiece 90 for 4 seconds, and then stops emitting for 1~2 seconds, and repeatedly executes the foresaid emitting. Next, step S114 is further executed. A detail description of step 114 will be described in later section.

The determining process will be executed continuously as follows. The control unit 201 shown in FIG. 2 determines if the geometric relationship between glass workpiece 90 and the processing contour line L is satisfied with $\gamma<1$. as shown in step S105. If $\gamma<1$. then step S106 is executed. If $\gamma<1$ is not satisfied (i. e. $1\leq\gamma\leq3$), then step S111 is executed.

The determining process will be further executed continuously as follows. The control unit 201 shown in FIG. 2 determines if the equivalent diameter øi of the processing contour line L is satisfied with øi≤15 mm, as shown in step S106. If øi≤15 mm (i.e. $\gamma<1$ and øi≤15 mm), then step S107 is executed. If øi≤15 mm is not satisfied (i. e. $\gamma<1$ and øi≤15 mm), then step S109 is executed.

The control unit 201 shown in FIG. 2 chooses the blanking process in the condition of $\gamma<1$ and øi≤15 mm from the storage unit 202, and controls the blanking device 20 to execute the blanking process. Wherein, executing the crack generating process is executed first. As shown in step S107, the outer area outside the processing contour line L of the glass workpiece 90 is heated up by the heater 24 of the hollow support element 23 disposed on the blanking device 20 shown in FIG. 2. A phenomenon of stress concentration is occurred on the modified portion of the glass workpiece 90 due to the thermal stress by the heating. Meanwhile, the control unit shown in FIG. 2 captures the images of the glass workpiece 90 by the optical detecting module 203 to determine if a crack is generated, including but not limited to. In other embodiments, the crack can be presumed by heating up the outer area outside the processing contour line L of the glass workpiece 90 for a specified time. Step S108 will be further executed when the crack is generated.

The separating process of the blanking process will be executed as follows. The clamping and contacting an inner area inside the processing contour line L of the glass workpiece 90 by the top clamping plate 251 and the bottom clamping plate 252 of the clamping module 25 in the blanking device 20 shown in FIG. 2. As shown in step S108, the inner area of the glass workpiece 90 is cooled down by using the cooler 26 of the blanking device 20 shown in FIG. 2, including but not limited. In other embodiments, the top clamping plate 251 and the bottom clamping plate 252 are also spaced a distance from the glass workpiece 90. The cooler 26 blows the cooling air to the inner area by passing through the top clamping plate 251 and the bottom clamping plate 252, to have the glass workpiece 90 cooling down its temperature there. Next, step S114 will be further executed and a detail description thereof will be described in later section.

The control unit 201 shown in FIG. 2 chooses a blanking process in the condition of $\gamma<1$ and øi>15 mm from the storage unit 202, and controls the blanking device 20 to execute the blanking process. Wherein, the crack generating process is executed first. A second laser beam is generated by the second laser module 21 of the blanking module 20 shown in FIG. 2. As shown in step S109, the second laser beam emits to the glass workpiece 90 along the processing contour line L to have the crack being generated in the modified portion. Meanwhile, a partial thermal stress is generated on the glass workpiece 90 on the processing contour line L. A crack is generated by a phenomenon of the stress concentration on the modified portion of the glass workpiece 90. Next, step S110 will be executed.

The separating process of the blanking process will be executed as follows. In step S110, the outer area outside the processing contour line L of the glass workpiece 90 is heated up by the heater 24 disposed on the hollow support element 23 of the blanking device 20 shown in FIG. 2. Next, step S114 will be further executed and a detail description of the step will be described in later section. For example, in the embodiment, when the outer edge of the glass workpiece 90 and the processing contour line L are both round-shaped, the thickness t of glass workpiece 90 equals to 3 mm, the equivalent diameter øi equals to 46 mm and the equivalent distance d equals to 42 mm, that is, on condition that the geometric relationship between the glass workpiece 90 and the processing contour line L is satisfied with $\gamma<1$ and øi>15, starting from the step S101 of modifying process and adopting step S110 that uses the heater 24 of the hollow support element 23 for heating up to 190°, until to the step S114 of blanking process, this can be completed in 10 seconds.

The control unit 201 shown in FIG. 2 chooses the blanking process in the condition of $1\leq\gamma\leq3$ from the storage unit 202 and controls the blanking device 20 to execute the blanking process. Wherein, the crack generating process is executed first. In detailed, a second laser beam is generated by the second laser module 21 of the blanking device 20 shown in FIG. 2. The second laser beam emits to the glass workpiece 90 along the processing contour line L to have the crack being generated in the modified portion, as shown in step S111. Meanwhile, partial thermal stress is generated on the processing contour line L of the glass workpiece 90. A crack is generated by a phenomenon of the stress concentration at the modified portion of the glass workpiece 90. Next, step S112 will be executed.

The separating process in the blanking process will be further executed as follows. The second laser module 21 of the blanking device 20 shown in FIG. 2 generates the second laser beam. The second laser beam emits to the outer area outside the processing contour line L of the glass workpiece 90 for heating up the outer area of the glass workpiece 90, as shown in step S112. Next, step S113 will be executed.

The separating process will be executed continuously as follows. After the step S112, the top clamping plate 251 and the bottom clamping plate 252 of the clamping module 25 in the blanking device 20 shown in FIG. 2 clamp and contact the inner area inside the processing contour line L of the glass workpiece 90. As shown in step S113, the cooler 26 of the blanking device 20 shown in FIG. 2 is used for cooing down the inner area of the glass workpiece 90, including but not limited to. In other embodiments, the top clamping plate 251 and the bottom clamping plate 252 are also spaced a distance from the glass workpiece 90. The cooler 26 blows the cooling air to the inner area of the glass workpiece 90 by passing through the top clamping plate 251 and the bottom clamping plate 252 for cooling down the temperature of the inner area of the glass workpiece 90. Next, step S114 will be executed.

The top clamping plate 251 and the bottom clamping plate 252 of the clamping module 25 in the blanking device 20 shown in FIG. 2 can clamp the inner area of the glass workpiece 90. The clamping module 25 and the inner area of the glass workpiece 90 move downward by the Z-axial driving module 27. Meanwhile, the outer area and the inner area of the glass workpiece 90 are separated from each other, as shown in step S114. In another embodiment, if the geometric relationship between the glass workpiece 90 and the processing contour line L is satisfied with γ>3, the glass workpiece 90 can separate the outer area and the inner area of the glass workpiece 90 by moving downward the inner area of the processing contour line L with the gravity of the glass workpiece 90 itself. Then, the top clamping plate 251 and the bottom clamping plate 252 can be opened by the clamping cylinder 255. The inner area of the glass workpiece 90 is supported by the bottom clamping plate 252. Also, the bottom clamping plate 252 and the inner area of the glass workpiece 90 can be moved away from the hollow support element 23 by means of X-axial driving module 28 and Y-axial driving module 29.

Besides, in the embodiment of multiple processing contour lines L on a glass workpiece 90, for example, on condition that executing multiple concentric processing contour lines L on a glass workpiece 90, step S101 can be executed first for multiple processing contour lines L. Then, a process including steps S102 up to S114 is executed, respectively for each of the multiple processing contour lines L from outside to inside, until all the processes for all of the multiple processing contour lines L are completed.

Figure 5:
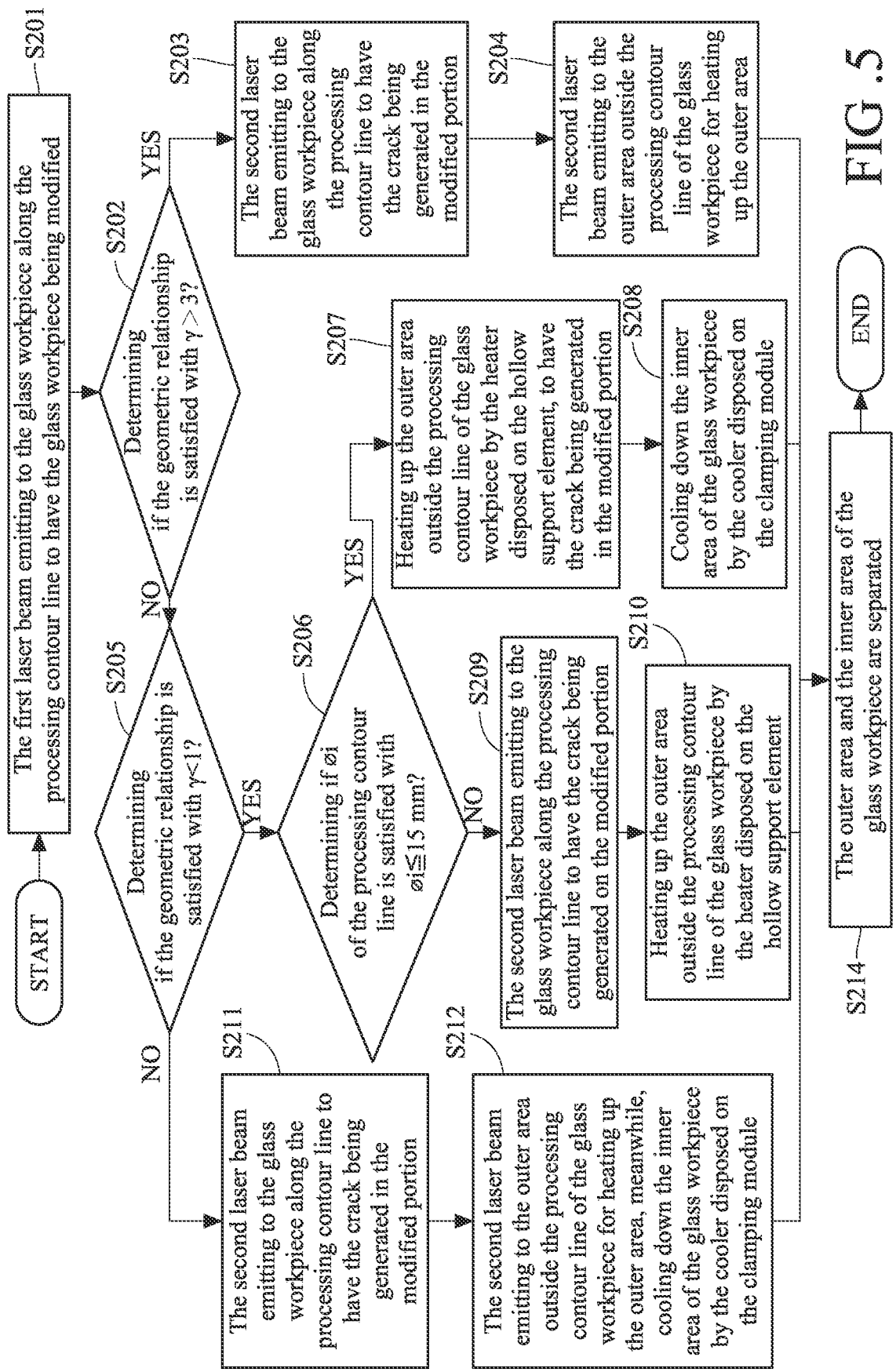
FIG. 5 is a flow chart of another embodiment of the laser processing method in accordance with this disclosure.

Refer to FIG. 5, FIG. 5 is a flow chart of another embodiment of the laser processing method in accordance with this disclosure.

Refer to FIG. 5, executing a modifying process can be shown as step S201, wherein the first laser module 11 of the modifying device 10 shown in FIG. 1 is used to emit a first laser beam, and the first laser beam emits to the glass workpiece 90 along a processing contour line L to have the glass workpiece being modified, as shown in step S201. The processing contour line L is a closed contour. Due to the first laser beam belongs to a pulse laser, therefore when the first laser beam scans along the processing contour line L, the glass workpiece 90 can be modified at the time that pulse is generated. The glass work piece 90 is continuously modified by means of the first laser beam which belongs to the pulse laser. In the present embodiment, the first laser beam emits the glass workpiece 90 along the processing contour line L of the glass workpiece, as shown in FIG. 4. After that, the glass workpiece 90 is placed on the hollow support element 23 of the blanking device 20 shown in FIG. 2. Next, step S202 will be executed.

Refer to FIG. 5, step S202 is a determining process. In detailed, the control unit 201 in FIG. 2 calculates γ=(øi/t)/d. As shown in FIG. 4, equivalent diameter of the processing contour line L is represented as øi, equivalent distance from the processing contour line L to outer edge of the glass workpiece is represented as d, the thickness of the glass workpiece 90 is represented as t. On condition that the shape of the processing contour line L and the shape of the outer edge of the glass workpiece 90 are both round, the diameter of the processing contour line L is an equivalent diameter øi, the distance from the processing contour line L to the edge of the glass workpiece 90 is an equivalent distance d. The control unit 201 shown in FIG. 2 further determines if the geometric relationship between glass workpiece 90 and the processing contour line L is satisfied with γ>3, as shown in step S202. If γ>3, then step S203 is executed. If γ>3 is not satisfied (i. e. γ≤3), then step S205 is executed.

The control unit 201 shown in FIG. 2 chooses a blanking process on condition that γ>3 from the storage unit 202 and controls the blanking device 20 to execute the blanking process. Wherein, executing a crack generating process in the blanking process is executed in advance. In detailed, a second laser beam is generated by using the second laser module 21 of the blanking device 20 shown in FIG. 2. As shown in step S203, the second laser beam emits to the glass workpiece 90 along the processing contour line L, to have the crack being generated in the modified portion. At this time, partial thermal stress is generated on the glass workpiece 90 along the processing contour line L. The crack is generated on the modified portion of the glass workpiece 90 by means of a phenomenon of stress concentration. Next, step S204 will be executed.

In step S204, the separating processing in blanking processing can be executed. The second laser beam is generated by the second laser module 21 of the blanking device 20 as shown in FIG. 2. As shown in step S204, the second laser beam emits an outer area outside the processing contour line L of the glass workpiece 90 to heat up the outer area of the glass workpiece 90. In the present embodiment, the second laser beam emits to an outer area outside the processing contour line L of the glass workpiece 90 for 4 seconds, and then stops emitting for 1~2 seconds, and repeatedly executes the foresaid emitting. Next, step S214 will be executed. A detail description of step S214 will be described in later section.

In step S205, a determining process is executed. The control unit 201 shown in FIG. 2 determines if the geometric relationship between glass workpiece 90 and processing contour line L is satisfied with γ<1, as shown in step S205. Refer to FIG. 5, if γ<1, then step S206 is executed. If γ<1 is not satisfied (i. e. 1≤γ≤3), then step S211 is executed.

In step S206, a further determining process is executed. The control unit 201 shown in FIG. 2 determines if the equivalent diameter øi of the processing contour line L is satisfied with øi≤15 mm, as shown in step S206. If øi≤15 mm (i.e. γ<1 and øi≤15 mm), then step S207 is executed. If øi≤15 mm is not satisfied (i. e. γ<1 and øi>15 mm), then step S209 is executed.

The control unit 201 shown in FIG. 2 chooses a blanking process in the condition of γ<1 and øi≤15 mm from the storage unit 202 and controls the blanking device 20 to execute the blanking process. Wherein, the crack generating process is executed first. As shown in step S207, heating up the outer area outside the processing contour line L of the glass workpiece 90 is executed by using the heater 24 of the hollow support element 23 disposed on the blanking device 20 shown in FIG. 2, to have the crack being generated in the modified portion. A phenomenon of stress concentration is occurred on the modified portion of the glass workpiece 90 due to the thermal stress by heating. Meanwhile, the control unit shown in FIG. 2 captures the images of the glass workpiece 90 by the optical detecting module 203 to determine if the crack is generated, including but not limited to. In other embodiments, the crack also can be presumed by heating up the outer area outside the processing contour line L of the glass workpiece 90 for a specified time. Step S208 will be executed when the crack is generated.

In step S208, the separating process in the blanking process can be executed. In detailed, the top clamping plate 251 and the bottom clamping plate 252 of the clamping module 25 in the blanking device 20 shown in FIG. 2, clamp and contact an inner area inside the processing contour line L of the glass workpiece 90. As shown in step 208, cooling down the inner area of the glass workpiece 90 is executed by using the cooler 26 of the blanking device 20 shown in FIG. 2, including but not limited. In other embodiments, the top clamping plate 251 and bottom clamping plate 252 are also spaced a distance from the glass workpiece 90. The cooler 26 blows the cooling air to the inner area of the glass workpiece 90 for cooling down the temperature there, by passing through the top clamping plate 251 and the bottom clamping plate 25. Next, step S214 will be executed. A detail description of step S214 will be described in later section.

The control unit 201 shown in FIG. 2 chooses a blanking process in the condition of $\gamma<1$ and $\varnothing i>15$ mm from the storage unit 202, and controls the blanking device 20 to execute the blanking process. Wherein, the crack generating process is executed first. In detailed, a second laser beam is generated by the second laser module 21 of the blanking module 20 shown in FIG. 2. The second laser beam emits to the glass workpiece 90 along the processing contour line L, to have to have the crack being generated in the modified portion, as shown in step 209. Meanwhile, a partial thermal stress is generated on the glass workpiece 90 along the processing contour line L. A crack is generated by means of a phenomenon of the stress concentration on the modified portion of the glass workpiece 90. Next, step S210 will be executed.

In step S210, the separating process in the blanking process can be further executed as follows. In detailed, heating up the outer area outside the processing contour line L of the glass workpiece 90 is executed by the heater 24 disposed on the hollow support element 23 of the blanking device 20 shown in FIG. 2. Next, step S214 will be further executed and a detail description thereof will be described in later section. For example, in an embodiment, when the outer edge of the glass workpiece 90 and the processing contour line L are both round-shaped, the thickness t of the glass workpiece 90 equals to 3 mm, the equivalent diameter $\varnothing i$ equals to 46 mm and the equivalent distance d equals to 42 mm, that is, on condition that the geometric relationship between the glass workpiece 90 and processing contour line L is satisfied with $\gamma<1$ and $\varnothing i>15$, starting from the step S201 of modifying, the heating step S210 of heating up the glass workpiece 90 to 190° C. by using the heater 24 of the hollow support element 23 to the step S214 of blanking can be completed in less than 10 seconds.

The control unit 201 shown in FIG. 2 chooses the blanking process in the condition of $1 \leq \gamma \leq 3$ from the storage unit 202 and controls the blanking device 20 to execute the blanking process. Wherein, the crack generating process is executed first. In detailed, a second laser beam is generated by the second laser module 21 of the blanking device 20 shown in FIG. 2. The second laser beam emits the glass workpiece 90 along the processing contour line L, to have the crack being generated on the modified portion, as shown in step 211. Meanwhile, partial thermal stress is generated on the processing contour line L of the glass workpiece 90. A crack is generated by means of a phenomenon of the stress concentration at the modified portion of the glass workpiece 90. Next, step S212 will be executed.

In step S212, executing the separating process in the blanking process can be executed. In detailed, the second laser module 21 of the blanking device 20 shown in FIG. 2 is used to generate the second laser beam. The second laser beam emits to the outer area outside the processing contour line L of the glass workpiece 90 for heating up the outer area outside the processing contour line, meanwhile, cooling down the inner area of the glass workpiece 90 by the cooler disposed on the clamping module, as shown in step 212. In detailed, the top clamping plate 251 and the bottom clamping plate 252 of the clamping module 25 in the blanking device 20 shown FIG. 2 clamp and contact inner area inside the processing contour line L of the glass workpiece 90, and the cooler 26 of the blanking device 20 cools down the inner area of the glass workpiece 90, including but not limited. In other embodiments, the top clamping plate 251 and the bottom clamping plate 252 also can be spaced a distance, and the cooler 26 blows the cooling air to the inner area of the glass workpiece 90 by passing through the top clamping plate 251 and bottom clamping plate 252 for cooling down the temperature. Meanwhile, heating up the outer area and cooling the inner area at same time. Next, step S214 will be executed.

As shown in step S214, separating the outer area and the inner area of the glass workpiece 90 can be executed. In detailed. the top clamping plate 251 and the bottom clamping plate 252 of the clamping module 25 in the blanking device 20 shown in FIG. 2 can clamp the inner area of the glass workpiece 90, and the clamping module 25 and the inner area of the glass workpiece 90 are moved downward by the Z-axial driving module 27. Meanwhile, the outer area and the inner area of the glass workpiece 90 are separated each other. In another embodiment, on the condition that the geometric relationship between the glass workpiece 90 and the processing contour line L is satisfied with $\gamma>3$, the glass workpiece 90 can separate the outer area and the inner area of the glass workpiece 90 by moving downward the inner area of the processing contour line L with the gravity of the glass workpiece itself. Then, the top clamping plate 251 and the bottom clamping plate 252 can be opened by the clamping cylinder 255. The inner area of the glass workpiece 90 is supported by the bottom clamping plate. Also, the bottom clamping plate 252 and the inner area of the glass workpiece 90 can be moved away from the hollow support element 23 by means of X-axial driving module 28 and Y-axial driving module 29.

Besides, in an embodiment of multiple processing contour lines L on the glass workpiece 90, for example, on condition that executing multiple concentric processing contour lines L on the glass workpiece 90, the glass workpiece 90 can execute step S201 for the multiple processing contour lines L first, then respectively execute a process including steps S202 up to S214 for each of the multiple processing contour lines L from outside to inside, until each of the multiple processing contour lines L completes its processing.

Figure 6:
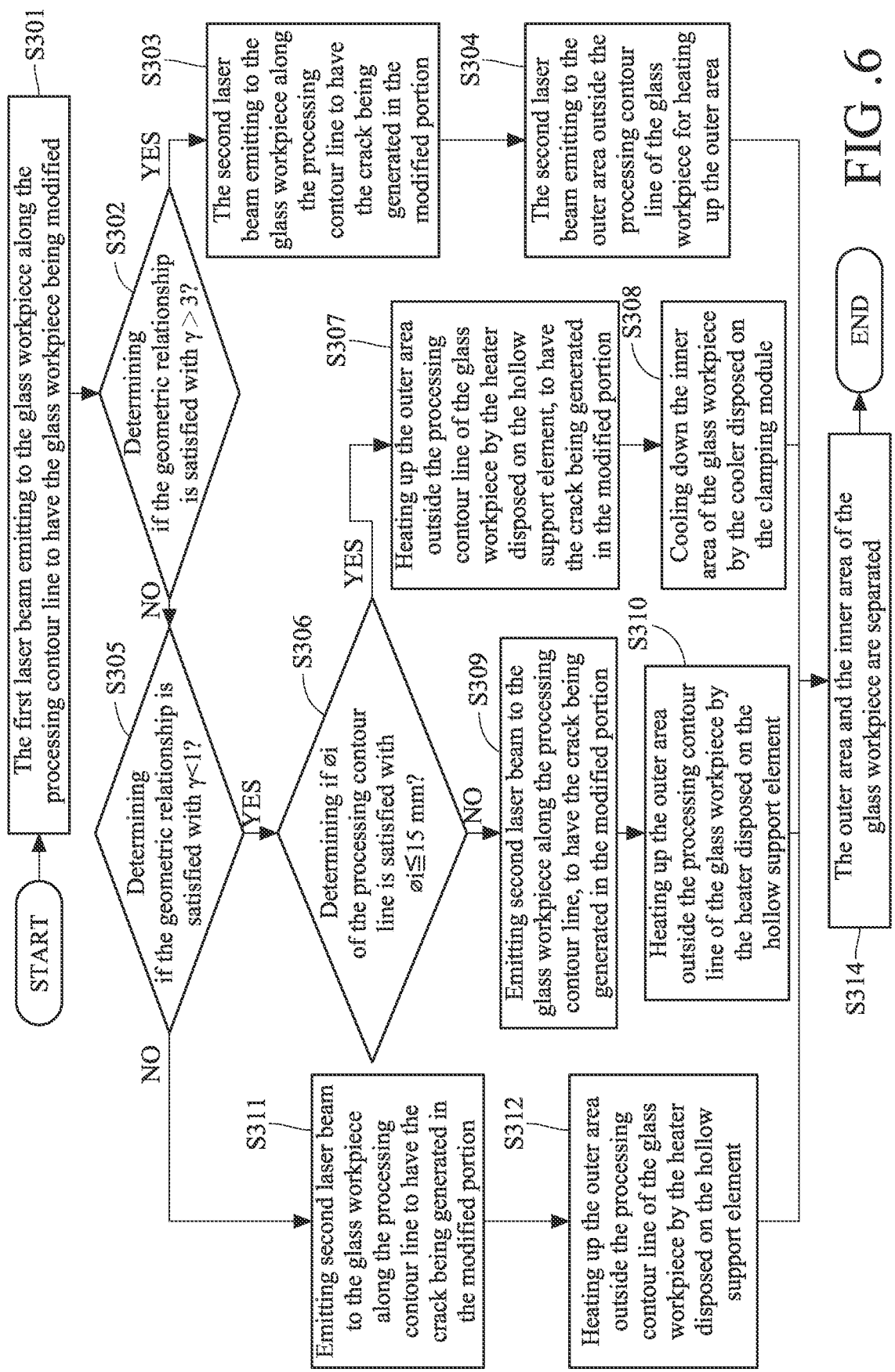
FIG. 6 is a flow chart of another embodiment of the laser processing method in accordance with this disclosure.

Refer to FIG. 6, FIG. 6 is a flow chart of another embodiment of the laser processing method in accordance with this disclosure.

Refer to FIG. 6, executing a modifying process can be shown, wherein the first laser module 11 of the modifying device 10 shown in FIG. 1 is used to generate a first laser beam, and the first laser beam emits to the glass workpiece 90 along a processing contour line L, to have the glass workpiece being modified, as shown in step S301. The processing contour line L is a closed contour. Due to the first laser beam belongs to a pulse laser, therefore when the first laser beam scans along the processing contour line L, the glass workpiece 90 can be modified at the time that pulse is generated. The glass work piece 90 is continuously modified by means of the first laser beam which belongs to the pulse laser. In the present embodiment, the first laser beam emits to the glass workpiece 90 along the processing contour line L of the glass workpiece, as shown in FIG. 4. After that, the glass workpiece 90 is placed on the hollow support element 23 of the blanking device 20 shown in FIG. 2. Next, step S302 will be executed.

Refer to FIG. 6, step S302 is a determining process. In detailed, the control unit 201 in FIG. 2 calculates $\gamma=(\text{øi}/t)/d$. As shown in FIG. 4, equivalent diameter of the processing contour line L is represented as øi, equivalent distance from the processing contour line L to outer edge of the glass workpiece is represented as d, the thickness of the glass workpiece 90 is represented as t. On condition that the shape of the processing contour line L and the shape of the outer edge of the glass workpiece 90 are both round, the diameter of the processing contour line L is an equivalent diameter øi, the distance from the processing contour line L to the edge of the glass workpiece 90 is an equivalent distance d. The control unit 201 shown in FIG. 2 further determines if the geometric relationship between glass workpiece 90 and processing contour line L is satisfied with $\gamma>3$, as shown in step S302. If $\gamma>3$, then step S303 is executed. If $\gamma>3$ is not satisfied (i. e. $\gamma\leq3$), then step S305 is executed.

The control unit 201 shown in FIG. 2 chooses a blanking process on condition that $\gamma>3$ from the storage unit 202, and controls the blanking device 20 to execute the blanking process. Wherein, executing a crack generating process in the blanking process is executed in advance. In detailed, a second laser beam is generated by using the second laser module 21 of the blanking device 20 shown in FIG. 2. As shown in step S303, the second laser beam emits to the glass workpiece 90 along the processing contour line L, to have the modified portion generating a crack. At this time, partial thermal stress is generated on the glass workpiece 90 along the processing contour line L. The crack is generated on the modified portion of the glass workpiece 90 by means of a phenomenon of stress concentration. Next, step S304 will be executed.

In step S304, the separating processing in blanking processing can be executed. The second laser beam is generated by the second laser module 21 of the blanking device 20 as shown in FIG. 2. As shown in step S304, the second laser beam emits to an outer area outside the processing contour line L of the glass workpiece 90 to heat up the outer area of the glass workpiece 90. In the present embodiment, the second laser beam emits to an outer area outside the processing contour line L of the glass workpiece 90 for 4 seconds, and then stops emitting for 1~2 seconds, and repeatedly executes the foresaid emitting. Next, step S314 will be executed. A detail description will be described in later section.

In step S305, a determining process is continuously executed as follows. The control unit 201 shown in FIG. 2 determines if the geometric relationship between glass workpiece 90 and processing contour line L is satisfied with $\gamma<1$, as shown in step S305. Refer to FIG. 6, if $\gamma<1$, then step S306 is executed. If $\gamma<1$ is not satisfied (i. e. $1\leq\gamma\leq3$), then step S311 is executed.

In step S306, a further determining process is executed. The control unit 201 shown in FIG. 2 determines if the equivalent diameter øi of the processing contour line L is satisfied with øi≤15 mm, as shown in step S306. If øi≤15 mm (i.e. $\gamma<1$ and øi≤15 mm), then step S307 is executed. If øi≤15 mm is not satisfied (i. e. $\gamma<1$ and øi>15 mm), then step S309 is executed.

The control unit 201 shown in FIG. 2 chooses a blanking process in the condition of $\gamma<1$ and øi≤15 mm from the storage unit 202, and controls the blanking device 20 to execute the blanking process. Wherein, the crack generating process is executed first. As shown in step S307, heating up the outer area outside the processing contour line L of the glass workpiece 90 is executed by using the heater 24 of the hollow support element 23 disposed on the blanking device 20 shown in FIG. 2. A phenomenon of stress concentration is occurred on the modified portion of the glass workpiece 90 due to the thermal stress by heating. Meanwhile, the control unit shown in FIG. 2 captures the images of the glass workpiece 90 by the optical detecting module 203 to determine if the crack is generated, including but not limited to. In other embodiments, the crack also can be presumed by heating up the outer area outside the processing contour line L of the glass workpiece 90 for a specified time. Step S308 will be executed when the crack is generated.

In step S308, the separating process in the blanking process can be executed. In detailed, the top clamping plate 251 and the bottom clamping plate 252 of the clamping module 25 in the blanking device 20 shown in FIG. 2, clamp and contact an inner area inside the processing contour line L of the glass workpiece 90. As shown in step 308, cooling down the inner area of the glass workpiece 90 is executed by using the cooler 26 disposed on the clamping module 25 in the blanking device 20 shown in FIG. 2, including but not limited. In other embodiments, the top clamping plate 251 and bottom clamping plate 252 are also spaced a distance from the glass workpiece 90. The cooler 26 blows the cooling air to the inner area of the glass workpiece 90 for cooling down the temperature there, by passing through the top clamping plate 251 and the bottom clamping plate 25. Next, step S314 will be executed. A detail description of step S314 will be described in later section.

The control unit 201 shown in FIG. 2 chooses a blanking process in the condition of $\gamma<1$ and øi>15 mm from the storage unit 202, and controls the blanking device 20 to execute the blanking process. Wherein, the crack generating process is executed first. In detailed, a second laser beam is generated by the second laser module 21 of the blanking module 20 shown in FIG. 2. The second laser beam emits to glass workpiece 90 along the processing contour line L, to have the modified portion generating a crack, as shown in step 309. Meanwhile, a partial thermal stress is generated on the glass workpiece 90 along the processing contour line L. A crack is generated by a phenomenon of the stress concentration on the modified portion of the glass workpiece 90. Next, S310 will be executed.

In step S310, the separating process in the blanking process can be further executed as follows. In detailed, heating up the outer area outside the processing contour line L of the glass workpiece 90 is executed by the heater 24 disposed on the hollow support element 23 of the blanking device 20 shown in FIG. 2. Next, step S314 will be further executed and a detail description thereof will be described in later section. For example, in an embodiment, when the outer edge of the glass workpiece 90 and the processing contour line L are both round-shaped, the thickness t of the glass workpiece 90 equals to 3 mm, the equivalent diameter øi equals to 46 mm and the equivalent distance d equals to 42 mm, that is, on condition that the geometric relationship between the glass workpiece 90 and processing contour line L is satisfied with $\gamma<1$ and øi>15, starting from the step S301 of modifying, the heating step S310 of heating up the glass workpiece 90 to 190° C. by using the heater 24 of the hollow support element 23 to the step S314 of blanking can be completed in less than 10 seconds.

The control unit 201 shown in FIG. 2 chooses the blanking process in the condition of $1\leq\gamma\leq3$ from the storage unit 202 and controls the blanking device 20 to execute the blanking process. Wherein, the crack generating process is executed first. In detailed, a second laser beam is generated by the second laser module 21 of the blanking device 20 shown in FIG. 2. The second laser beam emits to the glass workpiece 90 along the processing contour line L, to have the crack being generated in the modified portion, as shown in step 311. Meanwhile, partial thermal stress is generated on the processing contour line L of the glass workpiece 90. A crack is generated by means of a phenomenon of the stress concentration at the modified portion of the glass workpiece 90. Next, step S312 will be executed.

In step S312, the separating process in the blanking process can be further executed as follows. In detailed, the heater 24 disposed on the hollow support element 23 of the blanking device 20 heats up the outer area outside the processing contour line L of the glass workpiece 90, as shown in step 312. Next, step S314 will be executed. A detail description of step 314 will be described in later section.

As shown in step S314, separating the outer area and the inner area of the glass workpiece 90 can be executed. In detailed. the top clamping plate 251 and the bottom clamping plate 252 of the clamping module 25 in the blanking device 20 shown in FIG. 2 can clamp the inner area of the glass workpiece 90, and the clamping module 25 and the inner area of the glass workpiece 90 are moved downward by the Z-axial driving module 27. Meanwhile, the outer area and the inner area of the glass workpiece 90 are separated from each other. In another embodiment, on condition that the geometric relationship between the glass workpiece 90 and the processing contour line L is satisfied with γ>3, the glass workpiece 90 can separate the outer area and the inner area of the glass workpiece 90 by moving downward the inner area of the processing contour line L with the gravity of the glass workpiece itself. Then, the top clamping plate 251 and the bottom clamping plate 252 can be opened by the clamping cylinder 255. The inner area of the glass workpiece 90 is supported by the bottom clamping plate. Also, the bottom clamping plate 252 and the inner area of the glass workpiece 90 can be moved away from the hollow support element 23 by means of X-axial driving module 28 and Y-axial driving module 29.

According to the embodiments mentioned above, in another embodiment of the present disclosure, a laser processing method for a glass workpiece comprises a modifying process, a blanking process, and a determining process. In the modifying process, a first laser beam emits to a glass workpiece along a processing contour line, to have the glass workpiece being intermittently modified along the processing contour line continuously. In the blanking process, a crack is generated in a modified portion of the glass workpiece. The crack divides the glass workpiece into an outer area and an inner area. The inner area is inside the outer area. A temperature of the glass workpiece is changed to have the glass workpiece being deformed, such that a difference between an inner size of the outer area and an outer size of the inner area reaches to a threshold value. The outer area and the inner area are separated. In the determining process, a γ value of γ=(øi/t)/d is calculated before the blanking process, and the blanking process is determined based on the γ value, wherein, of represents an equivalent diameter of the processing contour line, d represents an equivalent distance from the processing contour line to outer edge of the glass workpiece, and t represents a thickness of the glass workpiece.

Besides, in an embodiment of multiple processing contour lines L of the glass workpiece 90, for example, on condition that executing multiple concentric processing contour lines L on the glass workpiece 90, step S301 can be executed for the multiple processing contour lines L first, then, a procedure including steps S302 up to S314 is respectively executed for each of the multiple processing contour lines L from outside to inside until all the multiple processing contour lines L complete the procedure by themselves.

According to the laser processing system for the glass workpiece and the laser processing method thereof of the present disclosure, the modifying process, the blanking process and the determining process can be executed for the glass workpieces of different shapes and the processing contour lines of different shapes. This can be achieved by only determining the geometric relationship between the glass workpiece and the processing contour line in the determining process. Then, a corresponding blanking process can be chosen. Please refer to FIG. 7 to FIG. 9 as following.

Figure 7:
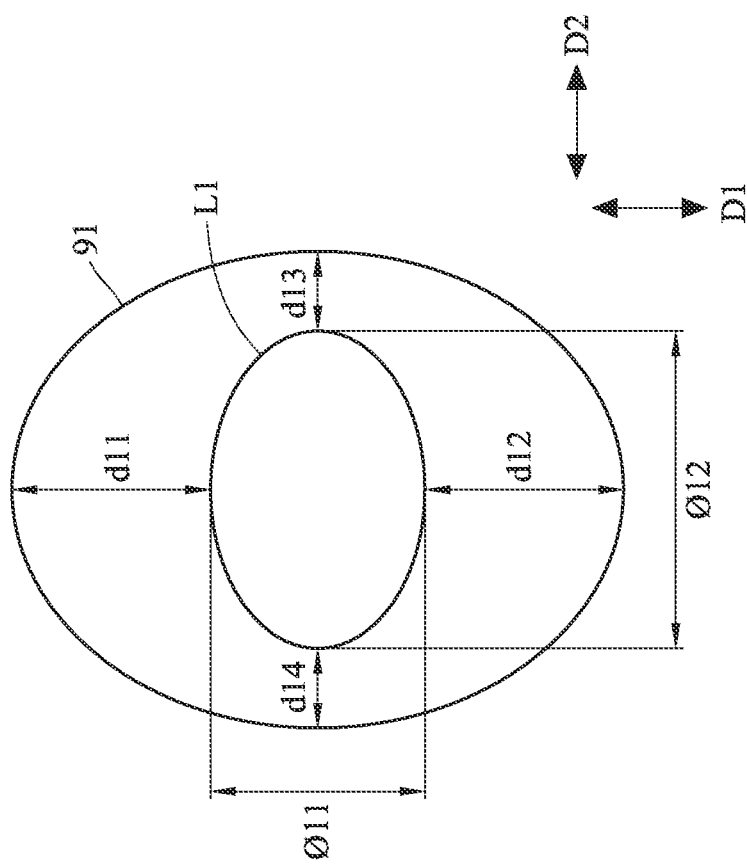
FIG. 7 is a top view of another exemplar of the processing contour line of the glass workpiece in accordance with this disclosure.

Refer to FIG. 7 which shows a top view of the processing contour line of another glass workpiece 91. The shape of the glass workpiece 91 and the shape of the processing contour line L1 are as shown in FIG. 7, which can be oval-like with a long axis and a short axis respectively. As shown in FIG. 7, the processing contour line L1 has a shorter diameter ø11 in the vertical direction D1 and a longer diameter ø12 in the horizontal direction D2. In the direction D1, the distances from the processing contour line L1 to the outer edge of the glass workpiece 91 are d11 and d12. In the direction D2, the distances from the processing contour line L1 to the outer edge of the glass workpiece 91 are d13 and d14. On this condition, the calculation of the equivalent diameter ø1 of the processing contour line L1 is ø1=(ø11+ø12)/2. The calculation of the equivalent distance d1 from the processing contour line L1 to glass workpiece 91 is d1=(d11+d12+d13+d14)/4.

Figure 8:
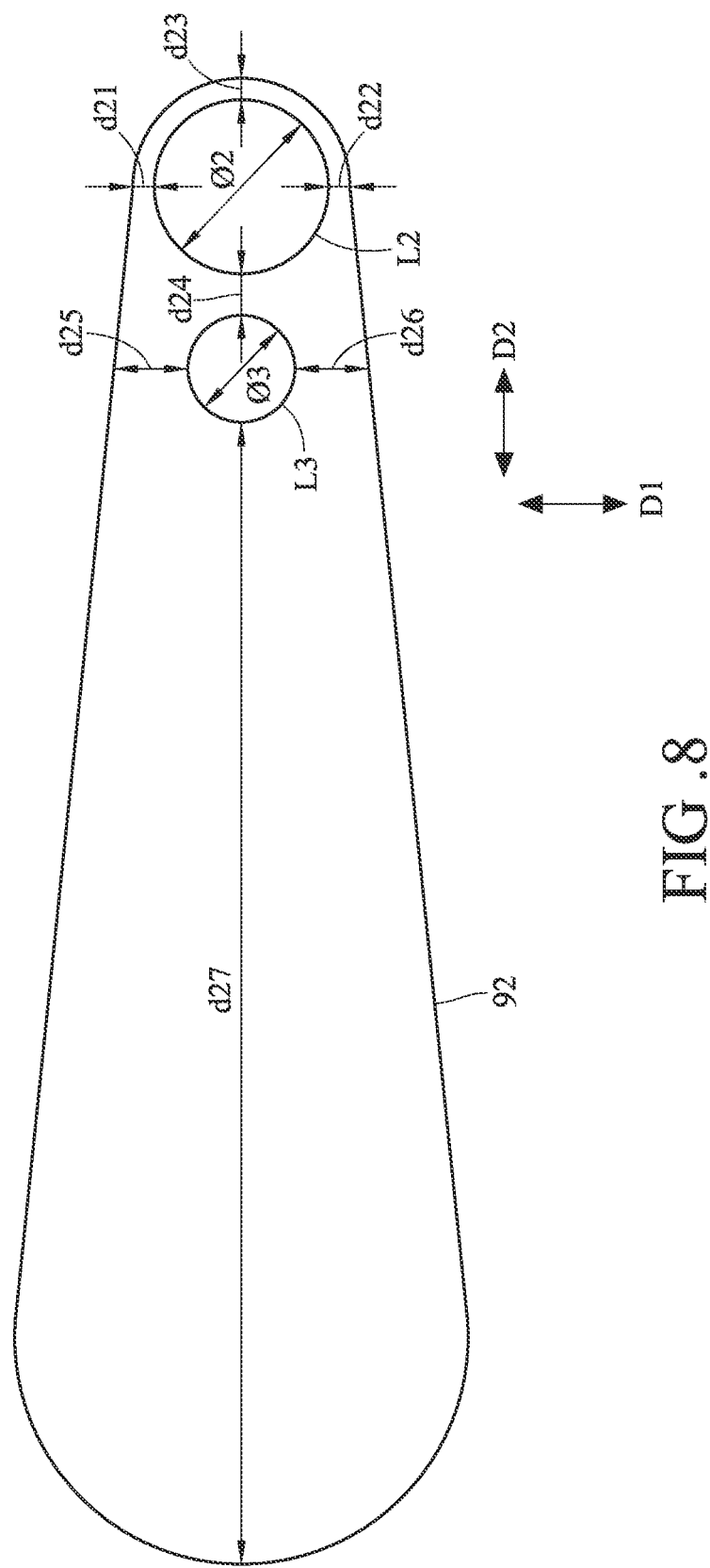
FIG. 8 is a top view of yet another exemplar of the processing contour line of the glass workpiece in accordance with this disclosure.

Please refer to FIG. 8 which shows a top view of the processing contour line of yet another glass workpiece. The shape of the glass workpiece 92 shown in FIG. 8 can be narrow and long. Multiple processing contour lines, for example, L2 and L3 are round-shaped and can be set on the glass workpiece 92. The processing contour lines L2 and L3 can be set on one side of the glass workpiece 92, the processing contour line L2 is located on the outer side of the glass workpiece 92 than the processing contour line L3 on the glass workpiece 92.

With regard to the processing contour line L2. the diameter ø2 of the processing contour line L2 is its equivalent diameter. In the vertical direction D1 in FIG. 8, the distances from the processing contour line L2 to the outer edge of the glass workpiece 92 are d21 and d22. In the horizontal direction D2 in FIG. 8, the distance from processing contour line L2 to the outer edge of the glass workpiece 92 is d23. Besides, the processing contour line L3 also belongs to one edge of the glass workpiece for the processing contour line L2. Therefore, the distance from processing contour line L2 to the processing contour line L3 in the horizontal direction D2 in FIG. 8 is d24. On this condition, the calculation of the equivalent distance d2 from the processing contour line L2 to the edge of the glass workpiece 92 is d2=(d21+d22+d23+d24)/4. For example, on condition that the thickness t of the glass workpiece 92 is 1.1 mm, the diameter ø2 of the processing contour line L2 is 65 mm and the distances from the processing contour line L2 to the outer edge of the glass workpiece 92 are d21=8 mm, d22=8 mm, d23=8 mm and d24=15.4 mm, γ=(ø2/t)/d2≈5.999. Therefore, on the condition of processing the processing contour line L2, the blanking process related to γ>3 will be executed.

With regard to the processing contour line L3, the diameter ø3 of the processing contour line L3 is its equivalent diameter. In the vertical direction D1 in FIG. 8, the distances from processing contour line L3 to the outer edge of the glass workpiece 92 are d25 and d26. In the horizontal direction D2 in FIG. 8, the distance from processing contour line L3 to the outer edge of the glass workpiece 92 is d27. Besides, the processing contour line L2 is also belongs to an edge of the glass workpiece for the processing contour line L3. Therefore, in the horizontal direction D2 in FIG. 8, the distance from processing contour line L2 to the processing contour line L3 is d24. On this condition, the calculation of the equivalent distance d3 from the processing contour line L3 to the edge of the glass workpiece 92 is d3=(d25+d26+d27+d24)/4. However, in the embodiment shown in FIG. 8, d27>n×ø3 and n>1. At this time, replacing d27 by n×ø3 is for the calculation, to have the calculation of the equivalent distance d3 being changed as d3=(d25+d26+n×ø3+d24)/4. For example, on condition that the thickness t of the glass workpiece 92 is 1.1 mm, the diameter ø3 of the processing contour line L3 is 40 mm, the distances from the processing contour line L3 to the outer edge of the glass workpiece 92 are d25=27.54 mm, d26=27.54 mm, d27=426 mm and d24=15.4 mm, and setting n=1.5, γ=(ø/t)/d3≈1.115. Therefore, on the condition of processing the processing contour line L3, the blanking process related to 1≤γ≤3 will be executed.

In the embodiment that executes multiple processing contour lines L2 and L3 on a glass workpiece 92, a modifying process for the multiple processing contour lines L2 and L3 can be executed first. Then, the blanking process will be respectively executed for the processing contour lines L2 and L3.

Figure 9:
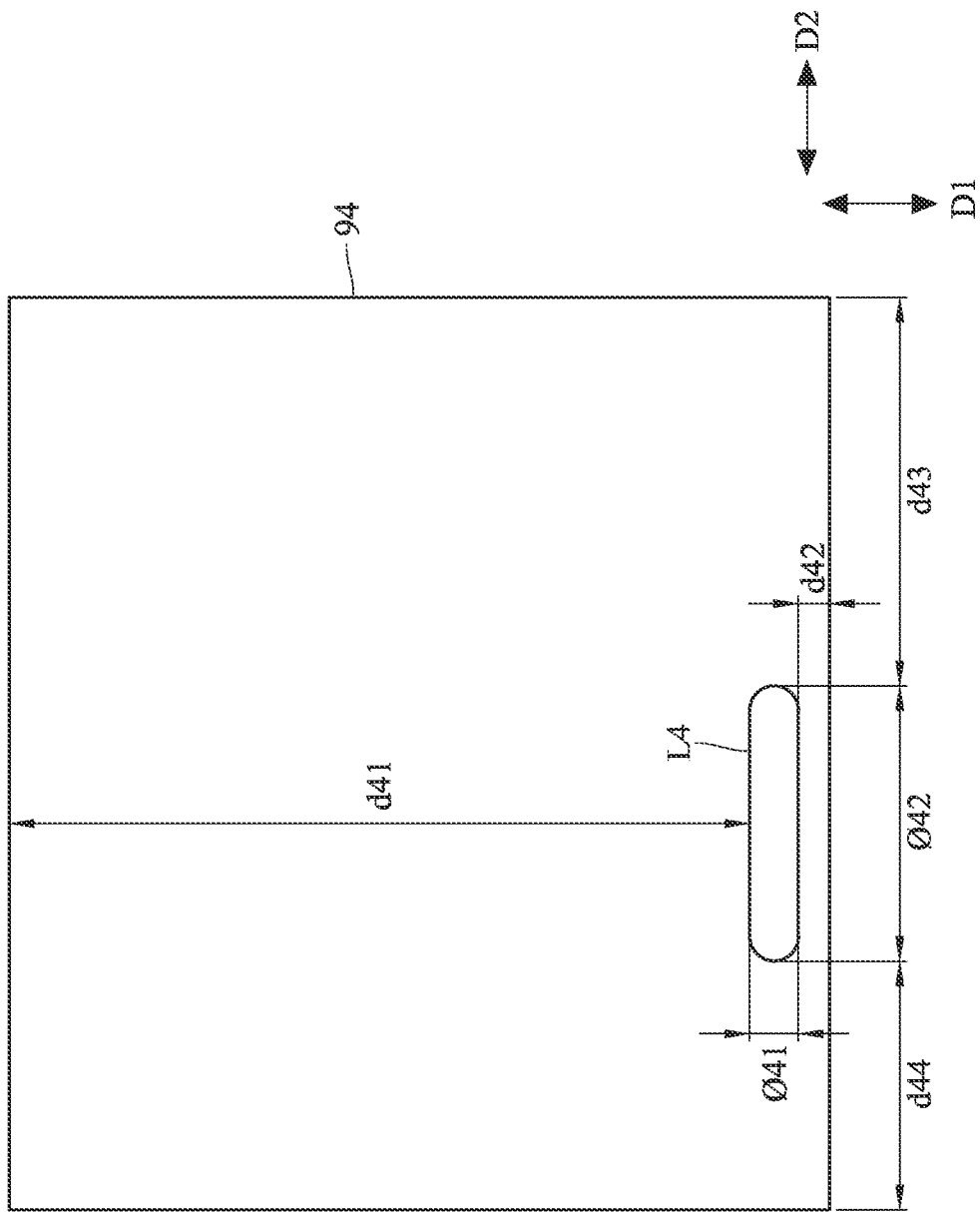
FIG. 9 is a top view of yet another exemplar of the processing contour line of the glass workpiece in accordance with this disclosure.

Please refer to FIG. 9 that shows a top view of the processing contour line of yet another glass workpiece. The shape of the glass workpiece can be rectangle. In the glass workpiece 94, the processing contour line L4 which is narrow and long can be set. The processing contour line L4 can be biased on one side of the glass workpiece 94.

The processing contour line L4 has a shorter diameter ø41 in the vertical direction D1 in FIG. 9 and has a longer diameter ø42 in the horizontal direction D2 in FIG. 9. In the direction D1, the distances from the processing contour line L4 to the outer edge of the glass workpiece 94 are d41 and d42. In the direction D2, the distances from the processing contour line L4 to the outer edge of the glass workpiece 94 are d43 and d44. On this condition, the calculation of the equivalent diameter ø4 of the processing contour line L4 is ø4=(ø41+ø42)/2. The calculation of the equivalent distance d4 from the processing contour line L4 to the glass workpiece 94 is d4=(d41+d42+d43+d44)/4. However, in the embodiment shown in FIG. 9, d41>n×ø4, d43>n×ø4, d44>n×ø4 and n>1. At this time, replacing d41, d43 and d44 by n×ø4 is for the calculation, to have the calculation of the equivalent distance d4 being changed as d4=(n×ø4+d42+n×ø4+n×ø4)/4. For example, on the condition that the thickness t of the glass workpiece 94 is 0.4 mm, the diameters of processing contour line L4 are ø41=12.5 mm, ø42=70.5 mm, and the distances from the processing contour line L4 to the outer edge of the glass workpiece 94 are d41=189.5 mm, d42=8 mm, d43=99.5 mm and d44=63.72 mm, and setting n=1.5, γ is calculated as γ=(ø4/t)/d4≈2.131. Therefore, on condition that processing the processing contour line L4, the blanking process related to 1≤γ=3 will be executed.

Therefore, according to the embodiments of the present disclosure, the equivalent diameter øi of the processing contour line is related to an average value of diameters on multi-directions of the processing contour line, the and equivalent distance is related to an average value of distances from the processing contour line to the edge of the glass workpiece on the multi-directions.

As mentioned above, an embodiment of the laser processing system and the laser processing method thereof for the glass workpiece in accordance with this disclosure, the glass workpiece is modified continuously by emitting to the glass workpiece with the first laser beam, to have cracks being generated in the modified portion of the glass workpiece, then the glass workpiece is further separated. Therefore, an edge chipping less than 10 μm is generated on the outer area and the inner area in normal, and the outer area and the inner area nearly have no material sacrifice width. Besides, when cutting a glass with diameter of 100 μm and thickness of 3 μm, it takes time less than 0.5 minutes. Furthermore, arithmetical average roughness (Ra) of the edge of the end product is less than 1 μm, and there is no necessity with another surface treatment. Thereby, an end product with less edge chipping, less material sacrifice width, short processing time and less arithmetical average roughness (Ra) of the cutting edge is obtained.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A laser processing method for a glass workpiece, which includes:
   a modifying process, emitting a first laser beam to the glass workpiece along at least one processing contour line, to have the glass workpiece being intermittently modified along the at least one processing contour line continuously;
   a blanking process, wherein a crack is generated in a modified portion of the glass workpiece, the crack divides the glass workpiece into an outer area and an inner area, and the inner area is inside the outer area, a temperature of the glass workpiece is changed to have the glass workpiece being deformed, such that a difference between an inner size of the outer area and an outer size of the inner area reaches to a threshold value, and the outer area and the inner area are separated; and
   a determining process, calculating a value of γ=(øi/t)/d before the blanking process based on the øi and γ value to determine the blanking process, wherein øi is an equivalent diameter of the at least one processing contour line, d is an equivalent distance from the at least one processing contour line to an outer edge of the glass workpiece, and t is a thickness of the glass workpiece, wherein
   when the shape of the at least one processing contour line and the shape of the outer edge of the glass workpiece are round and concentric, øi is a diameter of the at least one processing contour line, and d is a difference of a radius of the outer edge of the glass workpiece and a radius of the at least one processing contour line;
   when the at least one processing contour line comprises a first processing contour line and a second processing contour line, the shape of the first processing contour line and the shape of the second processing contour line are round, the shape of the outer edge of the glass workpiece is oval, and a long axis of the outer edge of the glass workpiece penetrates the first processing contour line and the second processing contour line,
   for the first processing contour line, øi is the diameter of the first processing contour line ø2, the calculation of the equivalent distance d is d2, and d2=(d21+d22+d23+d24)/4, wherein d21 and d22 are the distances from the first processing contour line to the outer edge of the glass workpiece along a short axis of the outer edge of the glass workpiece perpendicular to the long axis of the outer edge of the glass workpiece, d23 is the distance from the first processing contour line to the outer edge of the glass workpiece along the long axis of the outer edge of the glass workpiece, and d24 is the distance from the first processing contour line to the second processing contour line along the long axis of the outer edge of the glass workpiece, and for the second processing contour line, øi is the diameter of the second processing contour line ø3, the calculation of the equivalent distance d is d3, and d3=(d25+d26+d27+d24)/4, wherein d25 and d26 are the distances from the second processing contour line to the outer edge of the glass workpiece along the short axis of the outer edge of the glass workpiece, d27 is the distance from the second processing contour line to the outer edge of the glass workpiece along the long axis of the outer edge of the glass workpiece, and a comparison is made among d25, d26, d27, d24, and 1.5×ø3, if any of d25, d26, d27, or d24 is greater than or equal to 1.5×ø3, the corresponding value is replaced with 1.5×ø3;

when the shape of the at least one processing contour line is oval and the shape of the outer edge of the glass workpiece is rectangle, the calculation of the equivalent diameter øi is ø4, ø4=(ø41+ø42)/2 and the calculation of the equivalent distance d is d4, and d4=(d41+d42+d43+d44)/4, wherein ø41 is a diameter of the at least one processing contour line along a short axis of the at least one processing contour line, ø42 is a diameter of the at least one processing contour line along a long axis of the at least one processing contour line, d41 and d42 are the distances from the at least one processing contour line to the outer edge of the glass workpiece along the short axis of the at least one processing contour line, d43 and d44 are the distances from the at least one processing contour line to the outer edge of the glass workpiece along the long axis of the at least one processing contour line, and a comparison is made among d41, d42, d43, d44, and 1.5×ø4, if any of d41, d42, d43, or d44 is greater than or equal to 1.5×ø4, the corresponding value is replaced with 1.5×ø4;

when the shape of the at least one processing contour line and the shape of the outer edge of the glass workpiece are oval, the long axis and the short axis of the outer edge of the glass workpiece penetrate the at least one processing contour line, the long axis of the at least one processing contour line is overlapped with the short axis of the outer edge of the glass workpiece, and the short axis of the at least one processing contour line is overlapped with the long axis of the outer edge of the glass workpiece, the calculation of the equivalent diameter øi is ø1, ø1=(ø11+ø12)/2 and the calculation of the equivalent distance d is d1, and d1=(d11+d12+d13+d14)/4, wherein ø11 is a diameter of the at least one processing contour line along the short axis of the at least one processing contour line, ø12 is a diameter of the at least one processing contour line along the long axis of the at least one processing contour line, d11 and d12 are the distances from the at least one processing contour line to the outer edge of the glass workpiece along the short axis of the at least one processing contour line, d13 and d14 are the distances from the at least one processing contour line to the outer edge of the glass workpiece along the long axis of the at least one processing contour line;

when the shape of the at least one processing contour line and the shape of the outer edge of the glass workpiece are arranged in another configuration, the laser processing method stops;

the determining process determines if the value of γ is greater than 1 or the value of γ is less than 1 and a value of øi is greater than 15 mm, and when the value of γ is greater than 1 or the value of γ is less than 1 and the value of øi is greater than 15 mm, the blanking process comprises:

a crack generating process, emitting a second laser beam to the glass workpiece along the at least one processing contour line to have the crack being generated in the modified portion of the glass workpiece; and the determining process determines if the value of γ is less than 1 and a value of øi is not greater than 15 mm, and when the value of γ is less than 1 and the value of øi is not greater than 15 mm, the blanking process comprises:

a crack generating process, heating up the outer area by a heater until the crack being generated in the modified portion of the glass workpiece.

2. The laser processing method of claim 1, wherein the at least one processing contour line is a closed contour line.

3. The laser processing method of claim 1, wherein the determining process determines if the value of γ is greater than 3, and when the value of γ is greater than 3, the blanking process further comprises:

a separating process, emitting the second laser beam to the outer area for heating up the outer area after the crack generating process to have the outer area and the inner area being separated.

4. The laser processing method of claim 1, wherein the determining process determines if the value of γ is not less than 1 and not greater than 3, and when the value of γ is not less than 1 and not greater than 3, the blanking process further comprises:

a separating process, emitting the second laser beam to the outer area for heating up the outer area after the crack generating process, and then cooling down the inner area to have the outer area and the inner area being separated.

5. The laser processing method of claim 1, wherein the determining process determines if the value of γ is not less than 1 and not greater than 3, and when the value of γ is not less than 1 and not greater than 3, the blanking process further comprises:

a separating process, emitting the second laser beam to the outer area for heating up the outer area after the crack generating process, meanwhile, cooling down the inner area to have the outer area and the inner area being separated.

6. The laser processing method of claim 1, wherein the determining process determines if the value of γ is not less than 1 and not greater than 3, and when the value of γ is not less than 1 and not greater than 3, the blanking process further comprises:

a separating process, heating up the outer area by a heater after the crack generating process to have the outer area and the inner area being separated.

7. The laser processing method of claim 1, wherein the determining process determines if the value of γ is less than 1 and a value of øi is greater than 15 mm, and when the value of γ is less than 1 and the value of øi is greater than 15 mm, the blanking process further comprises:

a separating process, heating up the outer area by a heater after the crack generating process to have the outer area and the inner area being separated.

8. The laser processing method of claim 1, wherein the determining process determines if the value of γ is less than 1 and a value of øi is not greater than 15 mm, and when the value of γ is less than 1 and the value of øi is not greater than 15 mm, the blanking process further comprises:

a separating process, cooling down the inner area after the crack generating process so to have the outer area and the inner area being separated.

9. The laser processing method of claim 8, wherein in the crack generating process, while the heater is heating up the outer area by the heater, meanwhile, an image of the glass workpiece is continuously captured and it is determined from the image if the crack is generated in the glass workpiece, until the crack is generated in the modified portion of the glass workpiece, and then the separating process is carried on.

\* \* \* \* \*